(12) United States Patent
Bankoski et al.

(10) Patent No.: US 9,350,988 B1
(45) Date of Patent: May 24, 2016

(54) PREDICTION MODE-BASED BLOCK ORDERING IN VIDEO CODING

(71) Applicants: James Bankoski, Los Gatos, CA (US); Paul Gordon Wilkins, Cambridge (GB); Yaowu Xu, Sunnyvale, CA (US); Hui Su, College Park, MD (US)

(72) Inventors: James Bankoski, Los Gatos, CA (US); Paul Gordon Wilkins, Cambridge (GB); Yaowu Xu, Sunnyvale, CA (US); Hui Su, College Park, MD (US)

(73) Assignee: GOOGLE INC., Mountain View, CA (US)

(*) Notice: Subject to any disclaimer, the term of this patent is extended or adjusted under 35 U.S.C. 154(b) by 465 days.

(21) Appl. No.: 13/681,823

(22) Filed: Nov. 20, 2012

(51) Int. Cl.
*H04N 19/18* (2014.01)
*H04N 7/12* (2006.01)
*H04N 7/32* (2006.01)
*H04N 19/103* (2014.01)

(52) U.S. Cl.
CPC .............................. *H04N 19/00018* (2013.01)

(58) Field of Classification Search
CPC ............. H04N 7/12; H04N 7/50; H04N 7/64; H04N 7/32
See application file for complete search history.

(56) References Cited

U.S. PATENT DOCUMENTS

| | | | |
|---|---|---|---|
| 5,452,104 A | 9/1995 | Lee | |
| 6,108,383 A | 8/2000 | Miller et al. | |
| 6,243,416 B1 | 6/2001 | Matsushiro et al. | |
| 6,256,423 B1 | 7/2001 | Krishnamurthy et al. | |
| 6,434,197 B1 | 8/2002 | Wang et al. | |
| 6,473,460 B1 | 10/2002 | Topper | |
| 6,532,306 B1 | 3/2003 | Boon et al. | |
| 6,687,304 B1 | 2/2004 | Peng | |
| 7,116,830 B2 | 10/2006 | Srinivasan | |
| 7,218,674 B2 | 5/2007 | Kuo | |
| 7,236,527 B2 | 6/2007 | Ohira | |
| 7,253,831 B2 | 8/2007 | Gu | |
| 7,263,125 B2 | 8/2007 | Lainema | |
| 7,450,642 B2 | 11/2008 | Youn | |
| 7,457,362 B2 | 11/2008 | Sankaran | |
| 8,000,546 B2 | 8/2011 | Yang et al. | |
| 8,208,545 B2 | 6/2012 | Seo et al. | |

(Continued)

FOREIGN PATENT DOCUMENTS

| | | |
|---|---|---|
| EP | 0836328 | 4/1998 |
| KR | 1020080099835 | 11/2008 |

(Continued)

OTHER PUBLICATIONS

Adachi; "Cavlc Cleanup for ABT & Alternate Scan," Joint Collaborative Team on Video Coding, Geneva, Mar. 2011.

(Continued)

*Primary Examiner* — Sath V Perungavoor
*Assistant Examiner* — Patricia I Young
(74) *Attorney, Agent, or Firm* — Young Basile Hanlon & MacFarlane P.C.

(57) ABSTRACT

Video data streams can be encoded and decoded using inter or intra prediction. The blocks of a frame can be divided into groups of blocks to be inter predicted and blocks to be intra predicted, and the blocks to be inter predicted are encoded first. The availability of data from the inter predicted blocks can improve the performance of intra prediction over processing the blocks in the scan order since more pixel data is available for intra prediction of some blocks. For example, when the scan order is raster scan order, intra prediction of a block can use pixels peripheral to the bottom and right sides of the block in addition to the pixels peripheral to the top and left sides of the block.

17 Claims, 8 Drawing Sheets

(56) References Cited

U.S. PATENT DOCUMENTS

| | | | |
|---|---|---|---|
| 8,311,111 | B2 | 11/2012 | Xu et al. |
| 8,325,796 | B2 | 12/2012 | Wilkins et al. |
| 8,369,411 | B2 | 2/2013 | Au et al. |
| 8,526,498 | B2 | 9/2013 | Lim et al. |
| 8,666,181 | B2 | 3/2014 | Venkatapuram et al. |
| 8,711,935 | B2 | 4/2014 | Kim et al. |
| 8,724,702 | B1 | 5/2014 | Bulusu et al. |
| 8,761,242 | B2 | 6/2014 | Jeon et al. |
| 8,929,440 | B2 | 1/2015 | Nguyen et al. |
| 2005/0265447 | A1 | 12/2005 | Park |
| 2007/0268964 | A1 | 11/2007 | Zhao |
| 2008/0310745 | A1 | 12/2008 | Ye et al. |
| 2009/0196342 | A1 | 8/2009 | Divorra Escoda et al. |
| 2009/0232211 | A1 | 9/2009 | Chen et al. |
| 2010/0086028 | A1 | 4/2010 | Tanizawa et al. |
| 2010/0118945 | A1 | 5/2010 | Wada et al. |
| 2010/0128796 | A1 | 5/2010 | Choudhury |
| 2011/0085599 | A1 | 4/2011 | Jeong et al. |
| 2011/0235706 | A1 | 9/2011 | Demircin et al. |
| 2011/0243229 | A1 | 10/2011 | Kim et al. |
| 2011/0293001 | A1 | 12/2011 | Lim et al. |
| 2012/0014436 | A1 | 1/2012 | Segall et al. |
| 2012/0014437 | A1 | 1/2012 | Segall et al. |
| 2012/0014438 | A1 | 1/2012 | Segall et al. |
| 2012/0014439 | A1 | 1/2012 | Segall et al. |
| 2012/0014440 | A1 | 1/2012 | Segall et al. |
| 2012/0014445 | A1 | 1/2012 | Segall et al. |
| 2012/0057630 | A1 | 3/2012 | Saxena et al. |
| 2012/0082233 | A1 | 4/2012 | Sze et al. |
| 2012/0163457 | A1* | 6/2012 | Wahadaniah et al. .... 375/240.13 |
| 2012/0201297 | A1 | 8/2012 | Lim et al. |
| 2012/0320975 | A1 | 12/2012 | Kim et al. |
| 2012/0320984 | A1 | 12/2012 | Zhou |
| 2013/0003837 | A1 | 1/2013 | Yu et al. |
| 2013/0003857 | A1 | 1/2013 | Yu et al. |
| 2013/0089144 | A1 | 4/2013 | Lee |
| 2013/0266058 | A1 | 10/2013 | Minoo et al. |
| 2014/0092982 | A1 | 4/2014 | Panusopone et al. |

FOREIGN PATENT DOCUMENTS

| | | |
|---|---|---|
| WO | WO02104039 | 12/2002 |
| WO | WO2011150805 | 12/2011 |
| WO | WO2012122286 | 9/2012 |

OTHER PUBLICATIONS

Bossen, F., "Common test Conditions and Software Reference Configurations, " Joint Collaborative Team on Video Coding, JCTVC-D600, Jan. 2011.

Bross, Benjamin et al.: "High Efficiency Video Coding (HEVC) text specification draft 8," Joint Collaborative Team on Video Coding(JCT-VC) of ISO/IEC JTC1/SC29/WG11 and ITU-T SG16 WP3, document JCTVC-J1003_d7, 10th Meeting : Stockholm, SE, Jul. 11-20, 2012, all pages.

Davies, Thomas, "Unified scan processing for high efficiency coefficient coding," Joint Collaborative Team on Video Coding, Daegu, Jan. 2011.

ISR & Written Opinion, RE: Application # PCT/US2012/045075; Nov. 15, 2012.

ISR & Written Opinion, RE: Application #PCT/US2012/045048; Nov. 15, 2012.

ISR, & Written Opinion of the International Searching Authority for International Application No. ISR/US2013/058843 Nov. 22, 2013, 11 pages.

Karczewicz et al., "Modifications to intra blockes coefficient coding with VLC," Joint Collaborative Team on Video Coding, Torino, Jul. 2011.

Kerofsky et al., "Results of Core Experiment on Adaptive Block Transforms (ABT),"Video Coding Experts Group of ITU-T SG. 16; Eibsee, Germany; Jan. 2001.

Lee J H et al: "An Efficient Encoding of DCT Blocks With Block-Adaptive Scanning", IEICE Transactions on Communications, Communications Society, Tokyo, JP, vol. E-77-B, No. 12, Dec. 1, 1994, all pages.

Nguyen et al., "Improved Context Modeling for Coding Quantized Transform Coefficients in Video Compression,"Picture Coding Symposium, Dec. 8, 2010.

Sole et al., "Non-CE11: Diagonal sub-block scan for HE residual coding," Joint Collaborative Team on Video Coding, Geneva Mar. 2011.

Sole et al., "Unified scans for the significance map and coefficient level coding in high coding efficiency," Joint Collaborative Team on Video Coding, JCTVCF-288 Geneva, Jul. 8, 2011.

Sole, J., R. Joshi, and M. Karczewicz, "Unified scans for the significance map and coefficient level coding in high coding efficiency", JCTVC-E335, Joint Collaborative Team on Video Coding (JCT-VC) of ITU-T SG16 WP3 and ISO/IEC JTC1/SC29/WG11, Mar. 2011.

Song et al., "Mode dependent coefficient scan for inter blocks," JCTVC-F501, Joint Collaborative Team on Video Coding, Jul. 2011

Sze et al., "CE11: Summary Report on coefficient scanning and coding," Joint Collaborative Team on Video Coding, Daegu, Jan. 2011.

Sze et al., "Parallelization of HHI_Transform_Coding," Motion Picture Expert Group, Oct. 2010.

Wiegand T et al.:"WD3: Working Draft 3 of High-Efficiency Video Coding", 20110329, No. JCTVC-E603, Mar. 29, 2011, all pages.

"Series H: Audiovisual and Multimedia Systems; Infrastructure of audiovisual services—Coding of moving video; Advanced video coding for generic audiovisual services". H.264. Version 1. International Telecommunication Union. Dated May, 2003.

"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.

"Overview; VP7 Data Format and Decoder". Version 1.5. On2 Technologies, Inc. Dated Mar. 28, 2005.

"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.

"VP6 Bitstream & Decoder Specification". Version 1.02. On2 Technologies, Inc. Dated Aug. 17, 2006.

"Series H: Audiovisual and Multimedia Systems; Infrastructure of audiovisual services—Coding of moving video". H.264. Amendment 2: New profiles for professional applications. International Telecommunication Union. Dated Apr. 2007.

"VP6 Bitstream & Decoder Specification". Version 1.03. On2 Technologies, Inc. Dated Oct. 29, 2007.

"Series H: Audiovisual and Multimedia Systems; Infrastructure of audiovisual services—Coding of moving video". H.264. Advanced video coding for generic audiovisual services. Version 8. International Telecommunication Union. Dated Nov. 1, 2007.

"Series H: Audiovisual and Multimedia Systems; Infrastructure of audiovisual services—Coding of moving video". H.264. Advanced video coding for generic audiovisual services. International Telecommunication Union. Version 11. Dated Mar. 2009.

"Series H: Audiovisual and Multimedia Systems; Infrastructure of audiovisual services—Coding of moving video". H.264. Advanced video coding for generic audiovisual services. International Telecommunication Union. Version 12. Dated Mar. 2010.

"Implementors' Guide; Series H: Audiovisual and Multimedia Systems; Coding of moving video: Implementors Guide for H.264: Advanced video coding for generic audiovisual services". H.264. International Telecommunication Union. Version 12. Dated Jul. 30, 2010.

"VP8 Data Format and Decoding Guide". WebM Project. Google On2. Dated: Dec. 1, 2010.

Bankoski et al. "VP8 Data Format and Decoding Guide; draft-bankoski-vp8-bitstream-02" Network Working Group. Dated May 18, 2011.

Bankoski et al. "Technical Overview of VP8, An Open Source Video Codec for the Web". Dated Jul. 11, 2011.

(56) References Cited

OTHER PUBLICATIONS

Bankoski, J., Koleszar, J., Quillio, L., Salonen, J., Wilkins, P., and Y. Xu, "VP8 Data Format and Decoding Guide", RFC 6386, Nov. 2011.
Mozilla, "Introduction to Video Coding Part 1: Transform Coding", Video Compression Overview, Mar. 2012, 171 pp.
Han et al., "Jointly Optimized Spatial Prediction and Block Transform for Video and Image Coding," IEEE Transactions on Image Processing, vol. 21, No. 4 (Apr. 2012).
Han et al., "Toward Jointly Optimal Spatial Prediction and Adaptive Transform in Video/Image Coding," ICASSP 2010 (Dallas, TX, Mar. 14-19, 2010).
Office Action in a related matter. Korean Patent Application No. 10-2013-7034638, mailed May 11, 2015, listing new art.
Sze et al.; "CE11: Parallelization of HHI_Transform_Coding (Fixed Diagonal Scan from C227)", JCTVC-F129, Jul. 2011.
Wien et al., "H.26L Core Experiment Description for Adaptive Block Transforms", Video Coding Experts Group of ITU-T SG.16; Portland, Oregon; Aug. 2000.
Zheng, et al., Mode Dependent Coefficient Scanning, Joint Collaborative Team on Video Coding (JCT-VC) of ITU-T SG16 WP3 and ISO/IEC JTC1/SC29/WG11 4th Meeting: Daegu, KR, Jan. 18-20, 2011.

\* cited by examiner

PREDICTION MODE-BASED BLOCK ORDERING IN VIDEO CODING

TECHNICAL FIELD

This disclosure relates to encoding and decoding visual data, such as video stream data, for transmission or storage and subsequent display, with particular reference to multi-user video conferencing.

BACKGROUND

Digital video streams typically represent video using a sequence of frames or still images. Each frame can include a number of blocks, which in turn may contain information describing the value of color, brightness or other attributes for pixels. The amount of data in a typical video stream is large, and transmission and storage of video can use significant computing or communications resources. Various approaches have been proposed to reduce the amount of data in video streams, including compression and other encoding techniques.

SUMMARY

Disclosed herein are aspects of systems, methods and apparatuses for encoding a video stream. One implementation of a method for encoding a video stream includes identifying, in a frame of the video stream, a first group of blocks to be encoded using inter prediction, and identifying, in the frame, a second group of blocks to be encoded using intra prediction, the second group of blocks including at least one block that is located in the frame at a position that precedes, in a scan order of the frame, at least one block of the first group of blocks. The method also includes at least partially encoding, using inter prediction, the first group of blocks to form a first group of encoded blocks, at least partially decoding the first group of encoded blocks to form a first group of decoded blocks, encoding, using intra prediction, the second group of blocks using at least one block of the first group of decoded blocks, and inserting the first group of encoded blocks and the second group of encoded blocks into an encoded bitstream.

A method for decoding a video bitstream according to the teachings herein includes identifying, in a frame in the video stream, a first group of encoded blocks that were encoded using inter prediction, and identifying, in the frame, a second group of encoded blocks that were encoded using intra prediction, the second group of encoded blocks including at least one block that is located in the frame at a position that precedes, in a scan order, at least one block of the first group of encoded blocks. The method includes decoding, using inter prediction, the first group of encoded blocks to form a first group of decoded blocks, and decoding, using intra prediction, the second group of encoded blocks using at least one block of the first group of decoded blocks.

Another implementation of the teachings herein is an apparatus for encoding a video stream, including a memory and a processor. The processor is configured to execute instructions stored in memory to identify, in a frame of the video stream, a first group of blocks to be encoded using inter prediction, and identify, in the frame, a second group of blocks to be encoded using intra prediction, the second group of blocks including at least one block that is located in the frame at a position that precedes, in a scan order of the frame, at least one block of the first group of blocks. The processor is also configured to at least partially encode, using inter prediction, the first group of blocks to form a first group of encoded blocks, at least partially decode the first group of encoded blocks to form a first group of decoded blocks, encode, using intra prediction, the second group of blocks using at least one block of the first group of decoded blocks, and insert the first group of encoded blocks and the second group of encoded blocks into an encoded bitstream.

Variations in these and other aspects and implementations will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Digital video is used for various purposes including, for example, remote business meetings via video conferencing, high definition video entertainment, video advertisements, and sharing of user-generated videos. Image and video compression is can improve the efficiency of data transmission and storage of digital video. Compression techniques can be used to reduce the amount of information to be transmitted or stored. Internet based multimedia services such as streaming video web sites can rely on good compression technology to improve the quality of service and control the cost of bandwidth and content delivering at the same time.

In video compression, a block-based encoder-decoder system (codec) can first divide an image frame into blocks. The encoder can scan (e.g., in raster scan order) the blocks in the frame and pick the best prediction mode for each block based on previously-processed block. The encoder can subtract the predicted block from the block and encode the prediction residual. Aspects of this disclosure describe a new coding scheme that performs an extra pass through the blocks before prediction coding so as to re-order the encoding of blocks based on the prediction modes used. In the re-ordering, the blocks within an image frame using inter prediction modes are at least partially encoded and decoded first, and then the blocks using intra prediction modes are encoded. By such re-ordering, the encoder can have more information available from surrounding blocks to improve the quality of intra prediction, and can improve the overall coding efficiency. A decoder can perform the same re-ordering of blocks for decoding, relying on bits included in the encoded video bitstream to indicate which blocks can be decoded using inter prediction and which blocks can be decoded using intra prediction.

Grouping blocks in to two groups for encoding or decoding can permit the use of intra prediction modes where pixel data from more than two sides of a block can be used to form a prediction block. In some intra prediction modes, such as where blocks of a frame are processed in raster scan order, intra prediction modes are limited to modes using pixel data from blocks occurring before the block to be predicted in the raster scan order. Identifying blocks to be encoded or decoded using inter prediction and at least partially encoding these blocks first permits the use of pixel data from blocks on all four sides of a block to be used in prediction in some cases, thereby improving the performance of the encoding or decoding process.

First discussed below are environments in which aspects of this disclosure can be implemented.

Figure 1:
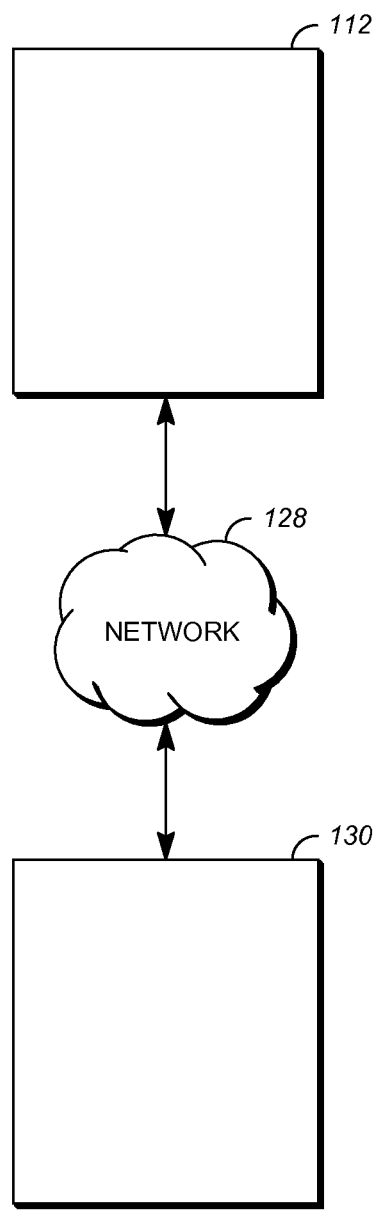
FIG. 1 is a schematic of a video encoding and decoding system.

FIG. 1 is a schematic of a video encoding and decoding system 100. An exemplary transmitting station 112 can be, for example, a computer having an internal configuration of hardware such as that described in FIG. 2. However, other suitable implementations of transmitting station 112 are possible. For example, the processing of transmitting station 112 can be distributed among multiple devices.

A network 128 can connect the transmitting station 112 and a receiving station 130 for encoding and decoding of a video stream. Specifically, the video stream can be encoded in transmitting station 112 and the encoded video stream can be decoded in receiving station 130. Network 128 can be, for example, the Internet. Network 128 can also be a local area network (LAN), wide area network (WAN), virtual private network (VPN), cellular telephone network or any other means of transferring the video stream from transmitting station 112 to, in this example, receiving station 130.

Figure 2:
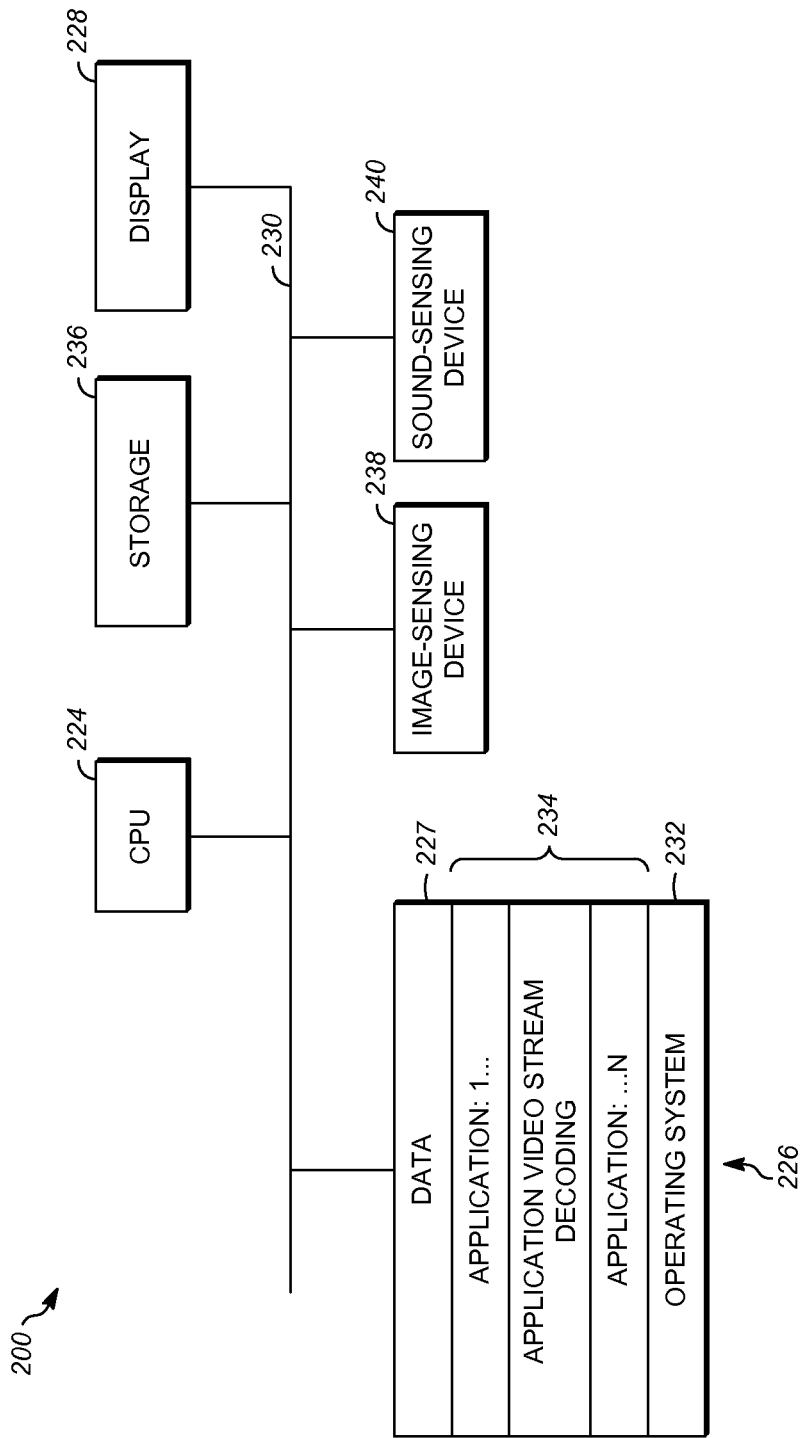
FIG. 2 is a block diagram of an exemplary computing device that can implement a transmitting station or a receiving station.

Receiving station 130, in one example, can be a computer having an internal configuration of hardware such as that described in FIG. 2. However, other suitable implementations of receiving station 130 are possible. For example, the processing of receiving station 130 can be distributed among multiple devices.

Other implementations of video encoding and decoding system 100 are possible. For example, an implementation can omit network 128. In another implementation, a video stream can be encoded and then stored for transmission at a later time to receiving station 130 or any other device having memory. In one implementation, receiving station 130 receives (e.g., via network 128, a computer bus, and/or some communication pathway) the encoded video stream and stores the video stream for later decoding. In an exemplary implementation, a real-time transport protocol (RTP) is used for transmission of the encoded video over network 128. In another implementation, a transport protocol other than RTP may be used, e.g., an HTTP-based video streaming protocol.

FIG. 2 is a block diagram of an exemplary computing device 200 that can implement a transmitting station or a receiving station. For example, computing device 200 can implement one or both of transmitting station 112 and receiving station 130 of FIG. 1. Computing device 200 can be in the form of a computing system including multiple computing devices, or in the form of a single computing device, for example, a mobile phone, a tablet computer, a laptop computer, a notebook computer, a desktop computer, and the like.

A CPU 224 in computing device 200 can be a conventional central processing unit. Alternatively, CPU 224 can be any other type of device, or multiple devices, capable of manipulating or processing information now-existing or hereafter developed. Although the disclosed implementations can be practiced with a single processor as shown, e.g., CPU 224, advantages in speed and efficiency can be achieved using more than one processor.

A memory 226 in computing device 200 can be a read only memory (ROM) device or a random access memory (RAM) device in an implementation. Any other suitable type of storage device can be used as the memory 226. Memory 226 can include code and data 227 that is accessed by CPU 224 using a bus 230. Memory 226 can further include an operating system 232 and application programs 234, the application programs 234 including at least one program that permits CPU 224 to perform the methods described here. As shown, for example, application programs 234 can include applications 1 through N, which further include a video stream decoding application that performs a method described here. Computing device 200 can also include a secondary storage 236 that can be, for example, a memory card used with a mobile computing device 200. Because the video communication sessions may contain a significant amount of information, they can be stored in whole or in part in secondary storage 236 and loaded into memory 226 as needed for processing.

Computing device 200 can also include one or more output devices, such as a display 228. Display 228 may be, in one example, a touch sensitive display that combines a display with a touch sensitive element that is operable to sense touch inputs. Display 228 can be coupled to CPU 224 via bus 230. Other output devices that permit a user to program or otherwise use computing device 200 can be provided in addition to or as an alternative to display 228. When the output device is or includes a display, the display can be implemented in various ways, including by a liquid crystal display (LCD), a cathode-ray tube (CRT) or light emitting diode (LEI)) display, such as an OLED display.

Computing device 200 can also include or be in communication with an image-sensing device 238, for example a camera, or any other image-sensing device 238 now existing or hereafter developed that can sense an image such as the image of a user operating computing device 200. Image-sensing device 238 can be positioned such that it is directed toward the user operating computing device 200. In an example, the position and optical axis of image-sensing device 238 can be configured such that the field of vision includes an area that is directly adjacent to display 228 and from which display 228 is visible.

Computing device 200 can also include or be in communication with a sound-sensing device 240, for example a microphone, or any other sound-sensing device now existing or hereafter developed that can sense sounds near computing device 200. Sound-sensing device 240 can be positioned such that it is directed toward the user operating computing device 200 and can be configured to receive sounds, for example, speech or other utterances, made by the user while the user operates computing device 200.

Although FIG. 2 depicts CPU 224 and memory 226 of computing device 200 as being integrated into a single unit, other configurations can be utilized. The operations of CPU 224 can be distributed across multiple machines (each machine having one or more of processors) that can be coupled directly or across a local area or other network. Memory 226 can be distributed across multiple machines such as a network-based memory or memory in multiple machines performing the operations of computing device 200. Although depicted here as a single bus, bus 230 of computing device 200 can be composed of multiple buses. Further, secondary storage 236 can be directly coupled to the other components of computing device 200 or can be accessed via a network and can comprise a single integrated unit such as a memory card or multiple units such as multiple memory cards. Computing device 200 can thus be implemented in a wide variety of configurations.

Figure 3:
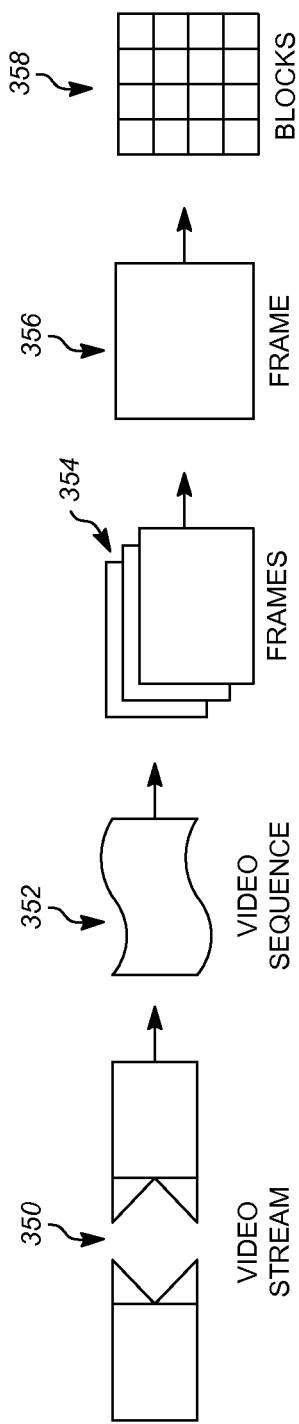
FIG. 3 is a diagram of a typical video stream to be encoded and subsequently decoded.

FIG. 3 is a diagram of an example of a video stream 350 to be encoded and subsequently decoded. Video stream 350 includes a video sequence 352. At the next level, video sequence 352 includes a number of adjacent frames 354. While three frames are depicted as adjacent frames 354, video sequence 352 can include any number of adjacent frames 354. Adjacent frames 354 can then be further subdivided into individual frames, e.g., a single frame 356. At the next level, single frame 356 can be divided into a series of blocks 358, which can contain data corresponding to, for example, 16×16 pixels in frame 356. The blocks 358 can also be arranged in planes of data. For example, a corresponding block 358 in each plane can respectively contain luminance and chrominance data for the pixels of the block 358. Blocks 358 can also be of any other suitable size such as 16×8 pixel groups or 8×16 pixel groups and can be further subdivided into smaller blocks depending on the application. Unless otherwise noted, the terms block and macroblock are used interchangeably herein.

Figure 4:
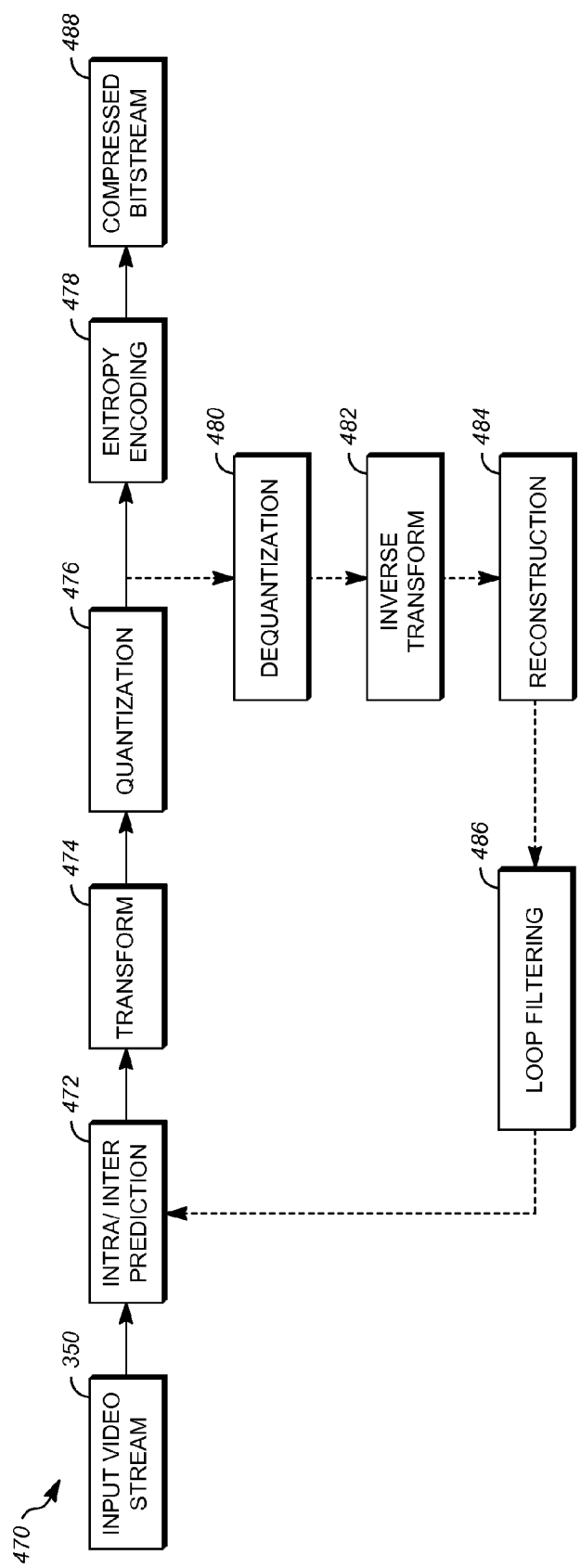
FIG. 4 is a block diagram of a video compression system in accordance with an aspect of this disclosure.

FIG. 4 is a block diagram of an encoder 470 in accordance with an aspect of this disclosure. Encoder 470 can be implemented, as described above, in transmitting station 112 such as by providing a computer software program stored in memory, for example, memory 226. The computer software program can include machine instructions that, when executed by a processor such as CPU 224, cause transmitting station 112 to encode video data in the manner described in FIG. 4. Encoder 470 can also be implemented as specialized hardware included, for example, in transmitting station 112. Encoder 470 has the following stages to perform the various functions in a forward path (shown by the solid connection lines) to produce an encoded or compressed bitstream 488 using input video stream 350: an intra/inter prediction stage 472, a transform stage 474, a quantization stage 476, and an entropy encoding stage 478. Encoder 470 may also include a reconstruction path (shown by the dotted connection lines) to reconstruct a frame for encoding of future blocks. In FIG. 4, encoder 470 has the following stages to perform the various functions in a reconstruction path: a dequantization stage 480, an inverse transform stage 482, a reconstruction stage 484, and a loop filtering stage 486. Other structural variations of encoder 470 can be used to encode video stream 350.

When video stream 350 is presented for encoding, each frame 356 within the video stream 350 can be processed in units of blocks 358. At the intra/inter prediction stage 472, each block can be encoded using intra-frame prediction or inter-frame prediction. In any case, a prediction block can be formed. In the case of intra-frame prediction, also called intra prediction herein, a prediction block can be formed from spatially nearby blocks in the current frame that have been previously encoded and reconstructed. In the case of inter-frame prediction (also called inter prediction herein), a prediction block can be formed from one or more blocks of previously-constructed reference frame(s) or temporally nearby frame(s) as identified by a respective motion vector.

Next, still referring to FIG. 4, the prediction block can be subtracted from the current block at intra/inter prediction stage 472 to produce a residual block (also called a residual). Transform stage 474 transforms the residual into transform coefficients in, for example, the frequency domain. Examples of block-based transforms include the Karhunen-Loève Transform (KLT), the Discrete Cosine Transform (DCT), and the Singular Value Decomposition Transform (SVD). In one example, the DCT transforms the block into the frequency domain. In the case of DCT, the transform coefficient values are based on spatial frequency, with the lowest frequency (DC) coefficient at the top-left of the matrix and the highest frequency coefficient at the bottom-right of the matrix.

Quantization stage 476 converts the transform coefficients into discrete quantum values, which are referred to as quantized transform coefficients, using a quantizer value or a quantization level. The quantized transform coefficients are then entropy encoded by entropy encoding stage 478. The entropy-encoded coefficients, together with other information used to decode the block, which may include for example the type of prediction used, motion vectors and quantizer value, are then output to compressed bitstream 488. Compressed bitstream 488 can be formatted using various techniques, such as variable length coding (VLC) or arithmetic coding. Compressed bitstream 488 can also be referred to as an encoded video stream and the terms are used interchangeably herein.

The reconstruction path in FIG. 4 (shown by the dotted connection lines) can be used to ensure that both encoder 470 and a decoder 500 (described below) use the same reference frames to decode compressed bitstream 488. The reconstruction path performs functions that are similar to functions that take place during the decoding process that are discussed in more detail below, including dequantizing the quantized transform coefficients at dequantization stage 480 and inverse transforming the dequantized transform coefficients at inverse transform stage 482 to produce a derivative residual block (also called a derivative residual). At reconstruction stage 484, the prediction block that was predicted at the intra/inter prediction stage 472 can be added to the derivative residual to create a reconstructed block. Loop filtering stage 486 can be applied to the reconstructed block to reduce distortion such as blocking artifacts.

Other variations of encoder 470 can be used to encode compressed bitstream 488. For example, a non-transform based encoder 470 can quantize the residual signal directly without transform stage 474. In another implementation, an encoder 470 can have quantization stage 476 and dequantization stage 480 combined into a single stage.

Figure 5:
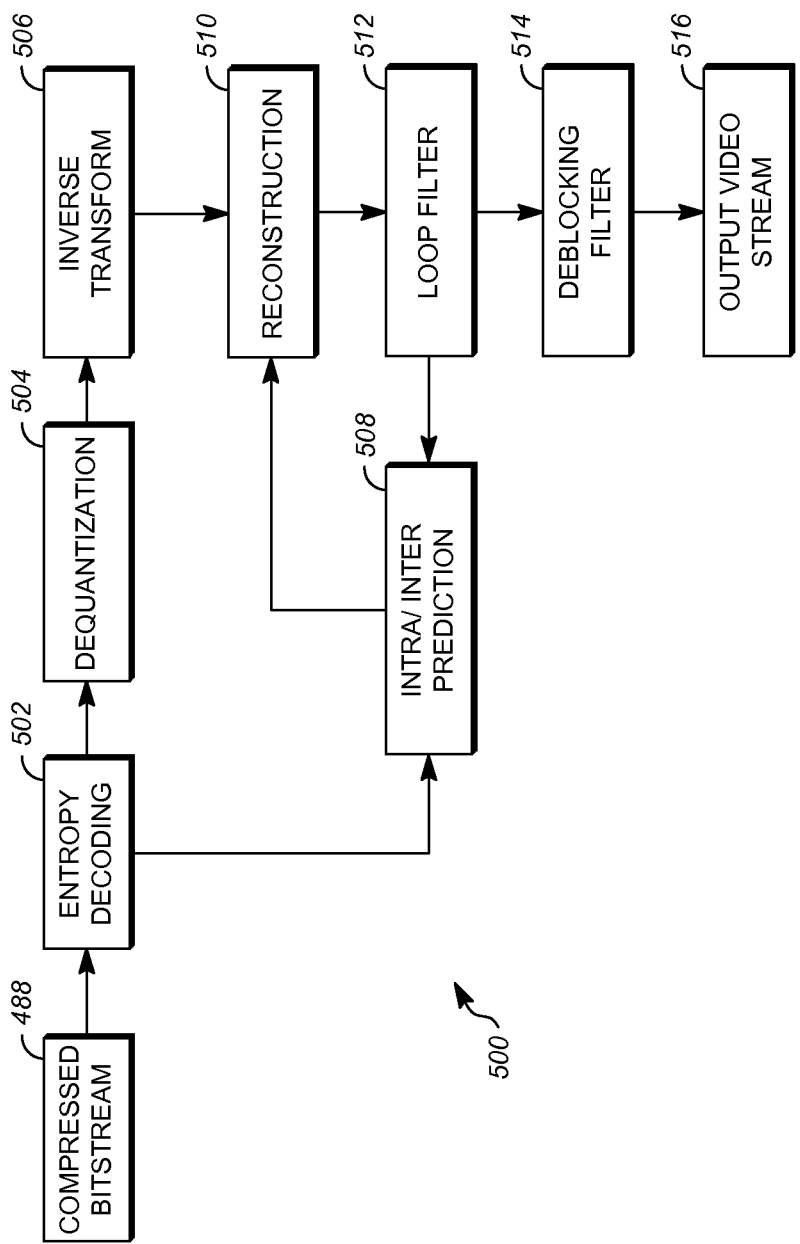
FIG. 5 is a block diagram of a video decompression system in accordance with another aspect of this disclosure.

FIG. 5 is a block diagram of a decoder 500 in accordance with an implementation. Decoder 500 can be implemented in receiving station 130, for example, by providing a computer software program stored in memory 226. The computer software program can include machine instructions that, when executed by a processor such as CPU 224, cause receiving station 130 to decode video data in the manner described in FIG. 5. Decoder 500 can also be implemented in hardware included, for example, in transmitting station 112 or receiving station 130.

Decoder 500, similar to the reconstruction path of encoder 470 discussed above, includes in one example the following stages to perform various functions to produce an output video stream 516 from compressed bitstream 488: an entropy decoding stage 502, a dequantization stage 504, an inverse transform stage 506, an intra/inter prediction stage 508, a reconstruction stage 510, a loop filtering stage 512 and a deblocking filtering stage 514. Other structural variations of decoder 500 can be used to decode compressed bitstream 488.

When compressed bitstream 488 is presented for decoding, the data elements within compressed bitstream 488 can be decoded by entropy decoding stage 502 (using, for example, arithmetic coding) to produce a set of quantized transform coefficients. Dequantization stage 504 dequantizes the quantized transform coefficients, and inverse transform stage 506 inverse transforms the dequantized transform coefficients to produce a derivative residual that can be identical to that created by inverse transform stage 482 in encoder 470. Using header information decoded from compressed bitstream 488, decoder 500 can use intra/inter prediction stage 508 to create the same prediction block as was created in encoder 470, e.g., at intra/inter prediction stage 472. At reconstruction stage 510, the prediction block can be added to the derivative residual to create a reconstructed block. Loop filtering stage 512 can be applied to the reconstructed block to reduce blocking artifacts. A postprocessing stage can be applied to the reconstructed block to further refine the image. In this example, deblocking filtering stage 514 is applied to the reconstructed block to reduce blocking distortion, and the result is output as output video stream 516. Output video stream 516 can also be referred to as a decoded video stream and the terms are used interchangeably herein.

Other variations of decoder 500 can be used to decode compressed bitstream 488. For example, decoder 500 can produce output video stream 516 without post-processing such as deblocking filtering stage 514.

Figure 6:
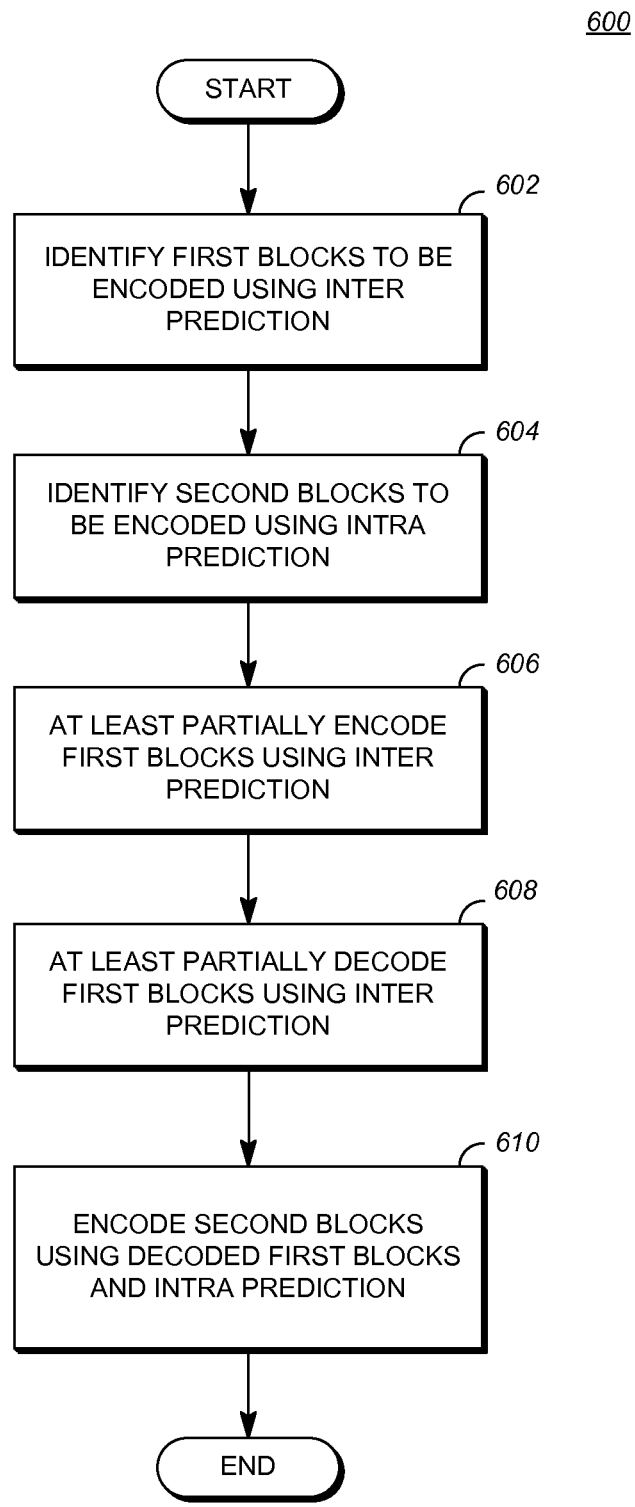
FIG. 6 is a flowchart of a process for encoding a video stream according to an aspect of this disclosure.

FIG. 6 is a flowchart of a process 600 for encoding a video stream according to an aspect of this disclosure. In this example, the video stream encodes blocks using inter-frame prediction first and then encodes blocks using intra-frame prediction. Process 600 can be implemented in an encoder such as encoder 470 to implement prediction mode block ordering to encode a video stream. Process 600 can be implemented, for example, as a software program that is executed by computing devices such as transmitting station 112 or receiving station 130. The software program can include machine-readable instructions that are stored in a memory such as memory 226 that, when executed by a processor such as CPU 224, cause the computing device to perform process 600. Process 600 can also be implemented using hardware. As explained above, some computing devices may have multiple memories and multiple processors, and the steps of process 600 may in such cases be distributed using different processors and memories. Use of the terms "processor" and "memory" in the singular herein encompasses computing devices that have only one processor or one memory as well as devices having multiple processors or memories that may each be used in the performance of some but not necessarily all of the recited steps.

For simplicity of explanation, process 600 is depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

At step 602, a first group of blocks is identified in a frame of the video stream. By identified we mean selected, chosen, determined or otherwise identified in any manner whatsoever. The first group of blocks are blocks to be encoded using inter prediction. As described above and in relation to FIGS. 4 and 5, inter prediction includes using pixel data from another frame to predict the pixel data in a block. In one example of implementing the teachings herein, the first group of blocks is identified by examining blocks of the frame in the scan order of the frame, and each block to be encoded using inter prediction is added to the first group of blocks.

At step 604, a second group of blocks is identified that are to be encoded using intra prediction. The second group of block can be identified in the same scan order of blocks as the first group. That is, when examining the blocks in the frame in the scan order of the frame, when a block is identified as to be encoded using intra prediction, that block is added to the second group of blocks. Accordingly, steps 602 and 604 may be performed during a single scan of the blocks of the frame by analyzing the blocks in the scan order for the optimal prediction mode and sorting the blocks into groups once that optimal prediction mode is selected.

Which prediction mode to use for a block can be determined by trying different prediction modes and comparing the results. For example, the sum of absolute differences for the resulting residual blocks for the various prediction modes can be compared. The prediction mode with the smallest residual can be selected for a given block. Note that although inter prediction is described generally as using block(s) of another frame to predict a block of the current frame, this disclosure contemplates that a current block may be encoded using inter prediction within the current frame through the use of a motion vector and another block within the current frame. Such a block would be included within the first group of blocks. The intra prediction modes tested as part of the identification in steps 602 and 604 can be restricted to those conventionally used with the scan order of the frame.

In identifying the second group of blocks, at least one block is identified that occurs in the scan order before at least one block of the first group. Blocks of a frame are scanned in particular orders. A typical order to use is raster scan order, where blocks of a frame are arranged in a rectangular array of rows and columns and the blocks of the array are accessed one at a time starting from the upper left hand corner and accessed in row order from the top row and moving down. Any scan order can be used with the teachings herein, but once a scan order is selected, a block in the second group would precede a block in the first group in the scan order if both groups were included in the same scan.

By dividing the blocks of the current frame to be encoded into two groups of blocks, those to be encoded using inter prediction and those to be encoded using intra prediction, the order of encoding the blocks can be manipulated to provide better prediction for intra coded blocks, and hence improving coding efficiency.

More particularly, and as described above in relation to FIGS. 4 and 5, intra prediction includes using pixel data from blocks peripheral to the block to be encoded to predict the pixel values in the block. The blocks used to form the prediction block are often encoded and decoded before being used for prediction. That is, since encoding and decoding can be lossy operations, the pixel values in the encoded and decoded block will not be exactly equal to the pixel values of the original block. By encoding and decoding the block before using it as a prediction block to predict another block, the encoder can use the same pixel values that a decoder will use to intra predict the same block. In the case of coding in raster scan order, for example, intra prediction often uses only pixels from above and to the left of the current block to form the prediction block. This arrangement guarantees that the pixel data of the blocks occurring before the block to be predicted will have been at least partially encoded and decoded before being used for prediction.

According to the teachings herein, the encoder can encode the first set of blocks first. These inter predicted blocks can then be decoded to form reconstructed, or decoded, blocks that can be used for intra prediction of the second set of blocks. In this way, the intra prediction modes for those blocks in the second set of blocks can be expanded to include intra prediction modes using blocks in any position relative to the current blocks where at least some of the blocks (i.e., earlier intra coded blocks in the scan order and the inter coded blocks) have already been encoded and decoded for prediction.

At next step 606, the first group of blocks is at least partially encoded. Generally, this partial encoding is lossy, meaning that reversing the encoding steps will not result in exactly the same pixel values as input. As shown in FIG. 4, for example, encoding a block of video data can include forming a prediction block, in this case from another frame or the current frame using motion vector(s), subtracting the prediction block from the block to be encoded, transforming the block using a transform as described above and then quantizing the transform data. The encoding of the first group of blocks can occur in the scan order, skipping those blocks belonging to the second group of blocks. The partially-encoded blocks from the first group of blocks may also be referred to as encoded blocks.

At step 608, the encoded blocks generated by the first group of blocks are partially decoded by reversing the lossy steps in encoding. In this example, this involves de-quantizing, inverse transforming and adding the inverse transformed block to the prediction block generated using inter prediction as described with reference to the reconstruction loop of FIG. 4. This yields pixel data that is equal to the pixel data formed when decoding the blocks at the decoder. An encoder can maintain a copy of the partially-encoded blocks in memory, for example, while performing the remaining steps in process 600 before completing the encoding of the blocks to include in the output video bitstream.

At step 610, the second group of blocks is encoded using intra prediction and at least some of the partially encoded and decoded first group of first blocks. Intra prediction uses pixels from blocks peripheral to a block to predict the pixel values within a current block. This process may be performed in the scan order after some or all blocks in the first group of blocks are encoded and decoded. As mentioned above, having encoded and decoded results from inter predicted blocks can improve the performance of intra prediction coded blocks by permitting additional prediction modes to be included in the encoding process. Accordingly, step 610 can include re-calculating the optimal intra prediction mode choice for each block to be encoded using intra prediction. Some of these intra prediction modes may use information from inter coded blocks that would have been coded after a current block if all blocks were encoded in the scan order or a predefined coding order. As a result, intra coding of the current block can make use of reconstructed pixel values from inter coded blocks that would have been previously been encoded after the current block as the inter coded blocks are already processed. The availability of these reconstructed pixel values may help improve the prediction quality when using intra prediction modes, therefore improving the overall coding efficiency of the video frame.

Figure 8:
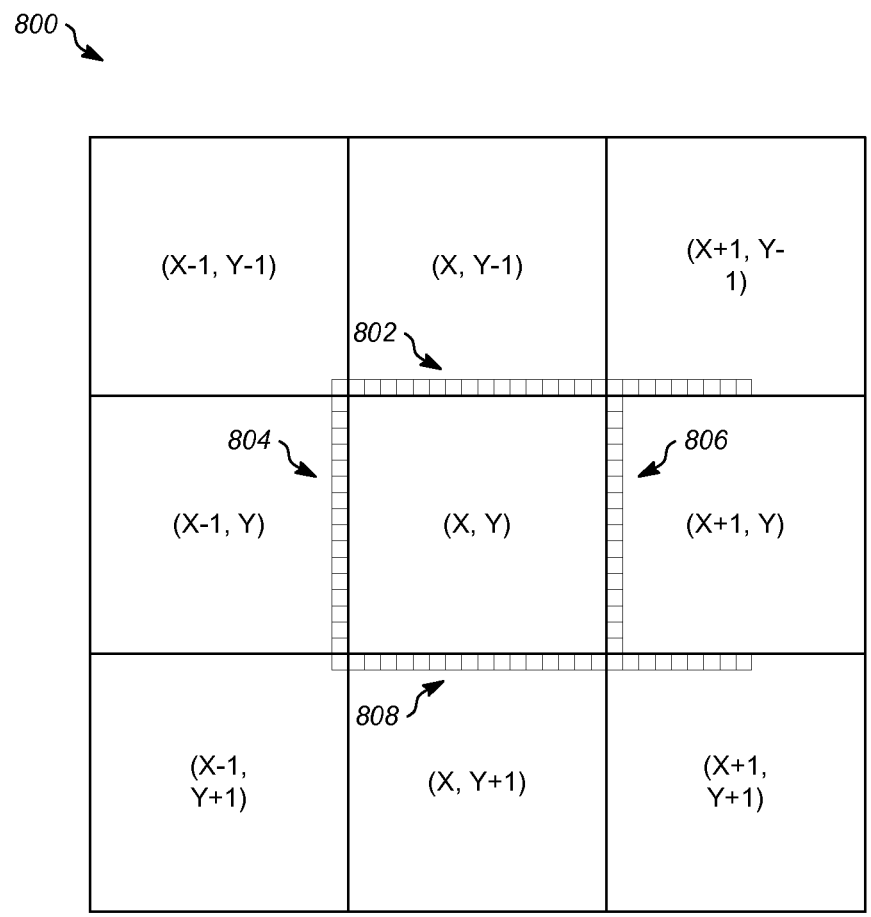
FIG. 8 is a diagram of blocks to be encoded or decoded according to aspects of this disclosure.

FIG. 8 can be used to explain this process. FIG. 8 is a diagram of blocks to be encoded or decoded according to aspects of this disclosure. In this example, the blocks are processed in raster scan order. If the blocks of a frame 800 were conventionally encoded in raster scan order, predicting current block (X, Y) may be performed using pixels in one or more of row 802 and column 804 belonging to blocks (X−1, Y−1), (X, Y−1), (X+1, Y−1) and (X−1, Y). Since these blocks, and hence the pixels of row 802 and column 804 are encoded and decoded before encoding the current block, they can be desirably used to form prediction blocks taking the lossy nature of the encoding into account. For example, in a vertical intra prediction mode, the pixel values of row 802 can be reproduced for each row of a prediction block to form the prediction block. In a horizontal prediction intra prediction mode, the pixel values of column 804 can be reproduced for each column of a prediction block to form the prediction block. Various diagonally-based intra prediction modes are available, at least some of which can use pixel values from both row 802 and column 804.

On the other hand, when blocks are encoded in raster scan order, the pixels from blocks (X+1, (X−1, Y+1), (X, Y+1) and (X+1, Y+1) would not be encoded and decoded at the time current block (X, Y) is encoded. Therefore, pixels from row 808 and column 806 are not available for intra prediction of current block (X, Y). According to implementations of the teachings herein, some or all of blocks (X+1, Y), (X−1, Y+1), (X, Y+1) and (X+1, Y+1) may be encoded out of order, i.e., as part of the first group of blocks, so as to provide pixels adjacent to current block (X, Y) for additional intra prediction modes. In an alternative vertical prediction mode, for example, the pixel values of row 808 can be used to form the prediction block. Similarly, in an alternative horizontal prediction mode, the pixel values of column 806 can be used to form the prediction block. Other prediction modes may be available using combinations of pixels values of row 808 and column 806, row 808 and column 804, and row 802 and column 806, for example.

Current block (X, Y) is one of the second group of blocks in this example. When encoding current block (X, Y) in step 610, an optimal intra prediction mode selected for the encoding may be one that uses any of these modes. Where some or all of blocks (X+1, Y), (X−1, Y+1), (X, Y+1) and (X+1, Y+1) are encoded in step 606 as part of the first group of blocks, the optimal intra prediction mode may be different from that determined when intra prediction is performed using only those modes associated with pixels of row 802 and column 804.

Referring again to FIG. 6, encoding the second group of blocks in step 610 involves the same lossy coding process of step 606. Step 610 may also include an additional lossless encoding step, such as entropy coding the quantized residual block Although not shown in FIG. 6, encoding of the blocks of the first group of blocks can also be completed by, for example, entropy coding the quantized residual block. The entropy coded, quantized residual blocks can then be packetized into a video bitstream for transmission or storage and subsequent decoding. The prediction modes can also be entropy encoded and included as part of the compressed video data.

Figure 7:
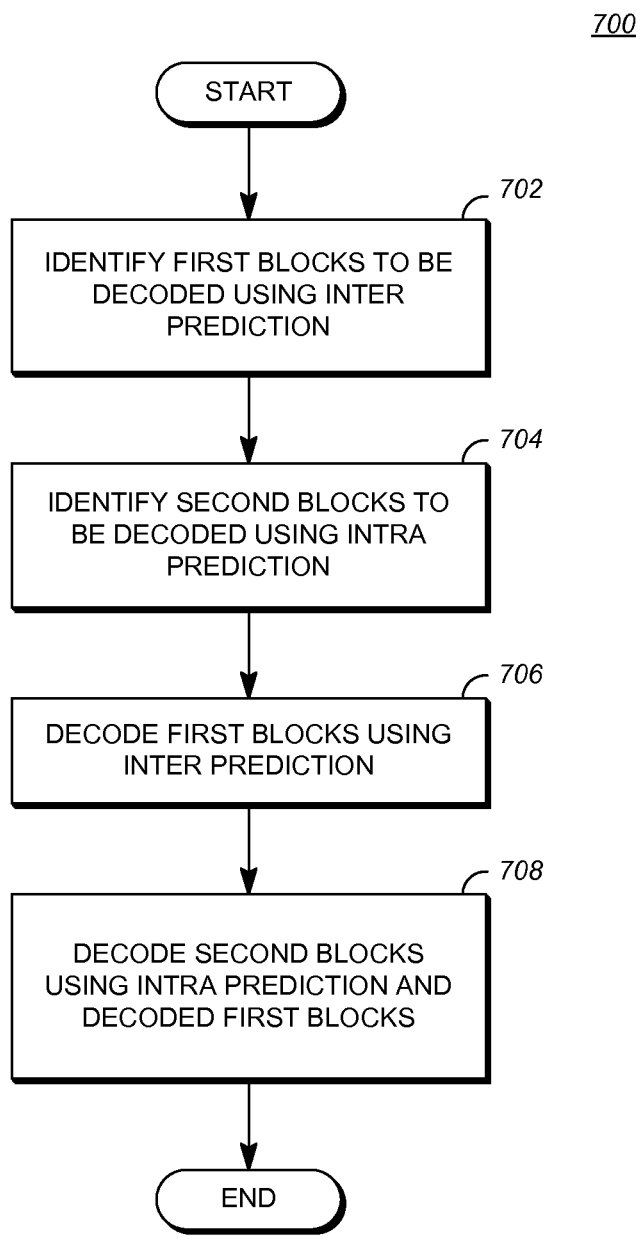
FIG. 7 is a flowchart of a process for decoding a video stream according to another aspect of this disclosure.

FIG. 7 is a flowchart of a process 700 for decoding a video bitstream according to another aspect of this disclosure. Broadly, in process 700, the first group of blocks of the video bitstream are decoded using inter prediction and then the second group of blocks of the video bitstream are decoded using intra prediction. Process 700 can be implemented in a decoder such as decoder 500 according to aspects of disclosed implementations. Process 700 can be implemented, for example, as a software program that is executed by computing devices such as transmitting station 112 or receiving station 130. The software program can include machine-readable instructions that are stored in a memory such as memory 226 that, when executed by a processor such as CPU 224, cause the computing device to perform process 700. Process 700 can also be implemented using hardware. As explained above, some computing devices may have multiple memories and multiple processors, and the steps of process 700 may in such cases be distributed using different processors and memories.

For simplicity of explanation, process 700 is depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

At step 702, process 700 identifies a first group of first blocks that can be decoded using inter prediction. At step 704, process 700 identifies a second group of blocks that can be decoded using intra prediction. As discussed above in relation to FIG. 6, the blocks of the frame can be identified in a scan order, which, for example, can be raster scan order. In this example, the decoder can perform entropy decoding to produce prediction modes for every block. All blocks are then grouped into two groups according to the prediction mode used. Accordingly, steps 702 and 704 may be performed as one step.

The blocks that can be decoded using each prediction method can be identified using bits included in the video bitstream by the encoder at the time the blocks were encoded, for example. These bits are included in the encoded video bitstream by an encoder to direct a decoder as to which prediction mode to use. As a result, blocks can be sorted into groups for decoding without requiring additional bits in the video bitstream beyond the bits typically included to identify the prediction mode.

At step 706, the first group of blocks is decoded using inter prediction. For example, each entropy decoded residual block is inverse transformed and dequantized to form a residual block. The decoder generates the prediction block for the current block using inter prediction, and the current block is reconstructed by adding the prediction block to the residual block as described with respect to FIG. 5. The first group of blocks can be decoded in the scan order for the frame, e.g., raster scan order.

At step 708, the second group of blocks is decoded using intra prediction and, depending on the intra prediction mode, the blocks decoded using inter prediction. For example, each entropy decoded residual block is inverse transformed and dequantized to form a residual block. The decoder generates the prediction block for the current block using intra prediction, and the current block is reconstructed by adding the prediction block to the residual block as described with respect to FIG. 5. The second group of blocks can be decoded in the scan order for the frame, e.g., raster scan order.

In this example, the processing of the blocks is performed according to raster scan order, i.e., from top to bottom and left to right. In other cases, processing of the blocks may be according to another predefined scan order, and the choice of such order is also encoded, so that the decoder can process the blocks in same order. No order definition other than the scan order needs to be encoded or transmitted.

According to the teachings herein, intra predicted blocks may use reconstructed pixel values from inter predicted blocks even when those inter predicted blocks would have been encoded/decoded after them in the normal scan order. By re-ordering the encoding and decoding of blocks based on their prediction modes, the encoder can effectively change the data dependency of the blocks in the encoding/decoding process. The blocks encoded later in a frame can, in this way, use all reconstructed pixel information from previously encoded blocks for improving the quality of prediction, therefore improve the coding efficiency.

The aspects of encoding and decoding described above illustrate some exemplary encoding and decoding techniques. However, it is to be understood that encoding and decoding, as those terms are used in the claims, could mean compression, decompression, transformation, or any other processing or change of data.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of transmitting station 112 and/or receiving station 130 (and the algorithms, methods, instructions, etc., stored thereon and/or executed thereby, including by encoder 470 and decoder 500) can be realized in hardware, software, or any combination thereof. The hardware can include, for example, computers, intellectual property (EP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 112 and receiving station 130 do not necessarily have to be implemented in the same manner.

Further, in one aspect, for example, transmitting station 112 or receiving station 130 can be implemented using a general purpose computer or general purpose processor with a computer program that, when executed, carries out any of the respective methods, algorithms and/or instructions described herein. In addition or alternatively, for example, a special purpose computer/processor can be utilized which can contain other hardware for carrying out any of the methods, algorithms, or instructions described herein.

Transmitting station 112 and receiving station 130 can, for example, be implemented on computers in a video conferencing system. Alternatively, transmitting station 112 can be implemented on a server and receiving station 130 can be implemented on a device separate from the server, such as a hand-held communications device. In this instance, transmitting station 112 can encode content using an encoder 470 into an encoded video signal and transmit the encoded video signal to the communications device. In turn, the communications device can then decode the encoded video signal using a decoder 500. Alternatively, the communications device can decode content stored locally on the communications device, for example, content that was not transmitted by transmitting station 112. Other suitable transmitting station 112 and receiving station 130 implementation schemes are available. For example, receiving station 130 can be a generally stationary personal computer rather than a portable communications device and/or a device including an encoder 470 may also include a decoder 500.

Further, all or a portion of implementations of the present invention can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

The invention claimed is:

1. A method for encoding a video stream, comprising:
processing, in a raster scan order, each block of a frame to determine a prediction mode for each block;
assigning, to a first group of blocks, each block of the frame to be encoded using inter prediction as the prediction mode;
assigning, to a second group of blocks, each block of the frame to be encoded using intra prediction, as the prediction mode, the second group of blocks including a block that is located in the frame at a position that precedes, in the raster scan order of the frame, a block of the first group of blocks;
after processing and assigning each block, and before encoding the second group of blocks, processing the first group of blocks by:
at least partially encoding, using inter prediction, the first group of blocks to form a first group of encoded blocks; and
at least partially decoding, using a processor, the first group of encoded blocks to form a first group of decoded blocks;
after processing the first group of blocks to form the first group of decoded blocks, processing the second group of blocks by:
encoding, using intra prediction, the second group of blocks using at least one block of the first group of decoded blocks such that the block of the second group of blocks is encoded by the block of the first group of blocks that it precedes in the raster scan order; and
inserting the first group of encoded blocks and the second group of encoded blocks into an encoded bitstream.

2. The method of claim 1, further comprising:
determining the prediction mode for each block by:
calculating, for a current block, a residual block for each of a plurality of prediction modes; and
selecting the prediction mode for the current block based the plurality of prediction modes resulting in the residual block having smallest residual values.

3. The method of claim 2 wherein the plurality of prediction modes includes a plurality of intra prediction modes, the plurality of intra prediction modes is limited to intra prediction modes using blocks adjacent to a left side of the current block and blocks adjacent to a top side of the current block.

4. The method of claim 1 wherein encoding the second group of blocks comprises:
determining an optimal intra prediction mode for a current block of the second group of blocks from a plurality of intra prediction modes, wherein at least one of the plurality of intra prediction modes includes pixels of the at least one block of the first group of decoded blocks; and
encoding the current block of the second group of blocks using the optimal intra prediction mode.

5. The method of claim 4 wherein the at least one of the plurality of intra prediction modes includes the pixels of a decoded block of the first group of decoded blocks that is peripheral to a right edge of the current block.

6. The method of claim 4 wherein the at least one of the plurality of intra prediction modes includes the pixels of a decoded block of the first group of decoded blocks that is peripheral to a bottom edge of the current block.

7. The method of claim 1 wherein at least partially encoding the first group of blocks to form the first group of encoded blocks comprises:
forming, using inter prediction, a prediction block for a current block of the first group of blocks;
forming a residual block for the current block as a difference between the prediction block and the current block;
transforming the residual block to form a transformed residual block; and quantizing the transformed residual block to form an encoded block of the first group of encoded blocks; and
wherein at least partially decoding the first group of encoded blocks to form the first group of decoded blocks comprises:
de-quantizing the encoded block of the first group of encoded blocks to form a second transformed residual block;
inverse transforming the second transformed block to form a second residual block; and
adding the second residual block to the prediction block for the current block to form a decoded block of the first group of decoded blocks.

8. The method of claim 7, further comprising:
entropy coding the first group of encoded blocks before inserting the first group of encoded blocks into the encoded bitstream.

9. A method for decoding a video bitstream, comprising:
processing each block in a frame in the video stream by:
identifying, in a frame in the video stream, a first group of encoded blocks that were encoded using inter prediction by assigning each block in the frame that was encoded using inter prediction into the first group of encoded blocks; and
identifying, in the frame, a second group of encoded blocks that were encoded using intra prediction by assigning each block in the frame that was encoded using intra prediction into the second group of encoded blocks, the second group of encoded blocks including a block that is located in the frame at a position that precedes, in a raster scan order, a block of the first group of encoded blocks;
after processing each block in the frame and before decoding the second group of encoded blocks:
decoding, using a processor performing inter prediction, the first group of encoded blocks to form a first group of decoded blocks; and
after decoding the second group of blocks:
decoding, using intra prediction, the second group of encoded blocks using at least one block of the first group of decoded blocks such that the block of the second group of blocks is decoded by the block of the first group of blocks that it precedes in the raster scan order.

10. The method of claim 9 wherein identifying the first group of encoded blocks and identifying the second group of encoded blocks comprises:
    entropy decoding the video bitsteam to obtain a prediction mode for each block of the frame; and
    sorting each block of the frame into one of the first group of encoded blocks or the second group of encoded blocks based on the prediction mode.

11. The method of claim 9 wherein decoding the second group of blocks comprises:
    performing intra prediction on the at least one block of the second group of decoded blocks using pixels from the one or more blocks from the first group of decoded blocks peripheral to at least one of a right edge and a bottom edge of the at least one block of the second group of blocks.

12. The method of claim 9, further comprising:
    entropy decoding the video bitstream; and wherein decoding the first group of encoded blocks comprises:
    selecting an encoded block of the frame according to the raster scan order;
    when the encoded block belongs to the first group of encoded blocks:
    de-quantizing the encoded block to form a transformed residual block;
    inverse transforming the transformed block to form a residual block;
    generating a prediction block for the encoded block using inter prediction; and
    adding the residual block to the prediction block to form a decoded block of the first group of decoded blocks; and
    when the encoded block belongs to the second group of encoded blocks:
    skipping processing of the encoded block.

13. The method of claim 12 wherein decoding the first group of encoded blocks comprises:
    selecting the encoded blocks skipped when decoding the first group of encoded blocks according to the raster scan order, the skipped encoded blocks belonging to the second group of encoded blocks;
    de-quantizing a current encoded block of the skipped encoded blocks to form a second transformed residual block;
    inverse transforming the second transformed block to form a second residual block;
    generating a second prediction block for the current encoded block using intra prediction; and
    adding the second residual block to the second prediction block to form a decoded block of the second group of decoded blocks.

14. An apparatus for encoding a video stream, comprising:
    a memory; and
    a processor configured to execute instructions stored in memory to:
    process, in a raster scan order, each block of a frame to determine a prediction mode for each block;
    assign, to a first group of blocks, each block of the frame to be encoded using inter prediction as the prediction mode;
    assign, to a second group of blocks, each block of the frame to be encoded using intra prediction as the prediction mode, the second group of blocks including a block that is located in the frame at a position that precedes, in the raster scan order of the frame, a block of the first group of blocks;
    after processing and assigning each block, and before encoding the second group of blocks, process the first group of blocks by:
    at least partially encoding, using inter prediction, the first group of blocks to form a first group of encoded blocks; and
    at least partially decoding the first group of encoded blocks to form a first group of decoded blocks;
    after processing the first group of blocks to form the first group of decoded blocks, process the second group of blocks by:
    encoding, using intra prediction, the second group of blocks using at least one block of the first group of decoded blocks such that the block of the second group of blocks is encoded by the block of the first group of blocks that it precedes in the raster scan order; and
    insert the first group of encoded blocks and the second group of encoded blocks into an encoded bitstream.

15. The apparatus of claim 14 wherein the processor is configured to process each block of the frame by:
    calculating residual values for one or more prediction modes for blocks of the frame;
    identifying the first group of blocks as the blocks of the frame having small residual values when a prediction mode is an inter prediction mode; and
    identifying the second group of blocks as the blocks of the frame having small residual values when the prediction mode is an intra prediction mode.

16. The apparatus of claim 14 wherein the processor is configured to encode the second group of blocks by:
    using pixels from the at least one block of the first group of decoded blocks that is peripheral to at least one of a right edge and a bottom edge of a current block of the second group of blocks to perform intra prediction on the current block.

17. The apparatus of claim 14 wherein the processor is configured to encode the second group of blocks by:
    determining an optimal intra prediction mode for a current block of the second group of blocks from a plurality of intra prediction modes, wherein at least one of the plurality of intra prediction modes includes pixels of the at least one block of the first group of decoded blocks; and
    encoding the current block of the second group of blocks using the optimal intra prediction mode.

* * * * *